United States Patent
Joffre et al.

[19]

[11] Patent Number: 6,108,133
[45] Date of Patent: Aug. 22, 2000

[54] STABILIZED MULTISPECTRAL SIGHTING SYSTEM

[75] Inventors: Jacques Joffre, L'Isle-Adam; Michel Broekaert, L'Etang-la-Ville; Fabrice Buatois, Neuilly sur Marne; Serge Encaoua, Carrieres sur Seine, all of France

[73] Assignee: Sagem SA, France

[21] Appl. No.: 09/094,586

[22] Filed: Jun. 15, 1998

[30] Foreign Application Priority Data

Jun. 16, 1997 [FR] France ................................ 97 07434

[51] Int. Cl.⁷ ...................................................... G02B 27/64
[52] U.S. Cl. ............................ 359/556; 359/554; 359/555
[58] Field of Search .................................... 359/554–557, 359/201, 203, 220–221, 223, 226, 872–874, 876, 900; 250/203.5, 203.6, 203.7; 396/52–55

[56] References Cited

U.S. PATENT DOCUMENTS

| | | | |
|---|---|---|---|
| 3,698,790 | 10/1972 | Berry | 359/555 |
| 3,961,179 | 6/1976 | Kuffer | 250/203.2 |
| 3,964,817 | 6/1976 | Humphrey | 359/555 |
| 4,123,136 | 10/1978 | Dahab et al. | 359/555 |
| 4,393,597 | 7/1983 | Picard et al. | 33/275 G |
| 4,580,270 | 4/1986 | Johnson et al. | 359/555 |

FOREIGN PATENT DOCUMENTS

| | | | |
|---|---|---|---|
| 0385079 | 1/1990 | European Pat. Off. . | |
| 647 633 | 2/1979 | Russian Federation | 359/555 |

*Primary Examiner*—Thong Nguyen
*Attorney, Agent, or Firm*—Larson & Taylor, PLC

[57] ABSTRACT

The device has a stabilization mirror that is angularly steerable about two mutually orthogonal axes, and an optical system for splitting an incoming light beam into at least two channels corresponding to different wavelengths. The stabilization mirror is steerable about a first axis (L) on internal equipment that is itself steerable about a second axis (I) orthogonal to the first and intersecting in an assembly that is steerable on a support about a third axis (C). A servo-control system has a gyroscopic sensor tied to the mirror and controlling steering motors. The system further includes, upstream from the stabilization mirror, and on the path of an incoming beam, a purely catoptric optical system that is stabilized, giving the inlet beam a size on the mirror that is smaller than the size of the inlet pupil of the system.

12 Claims, 5 Drawing Sheets

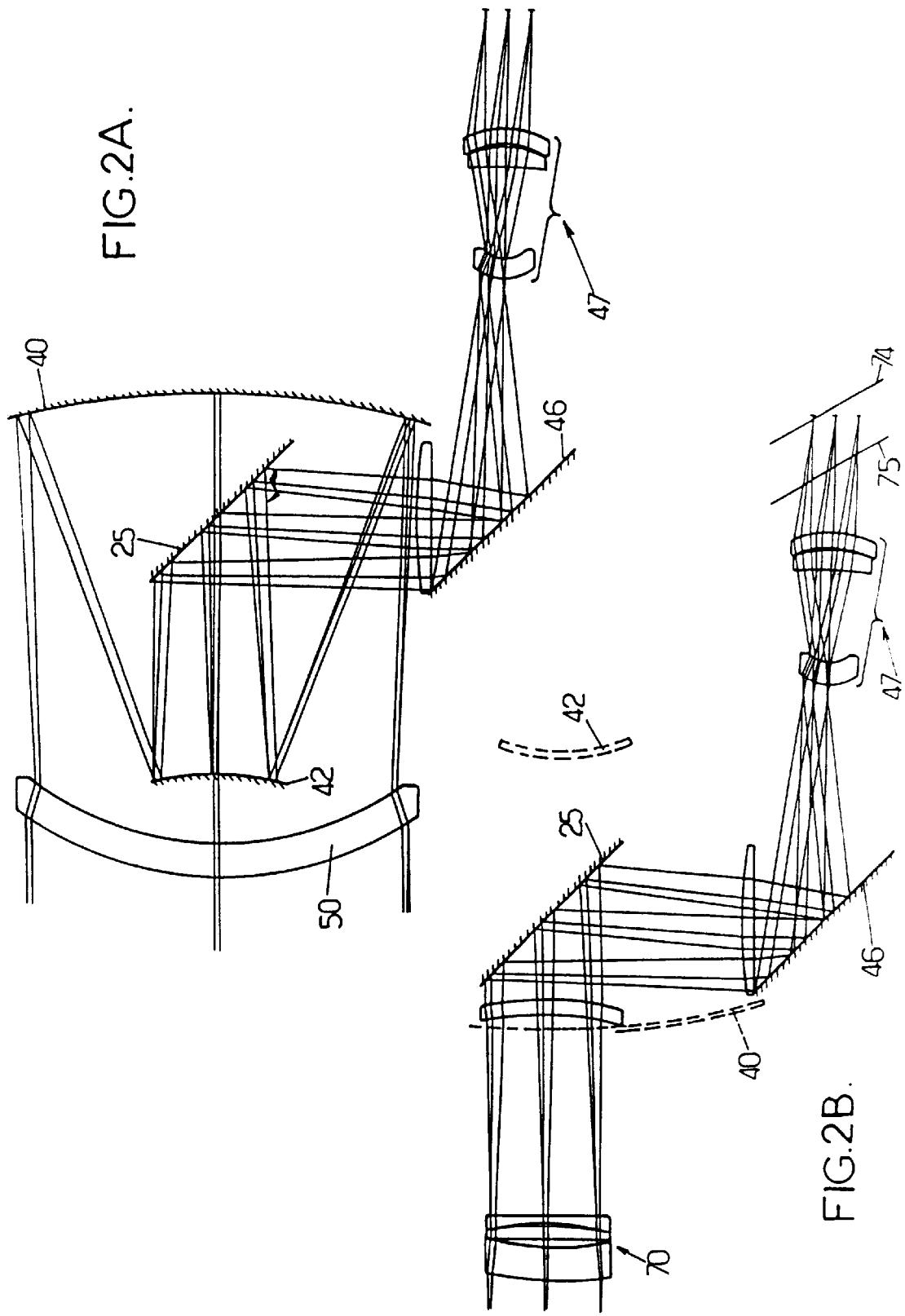

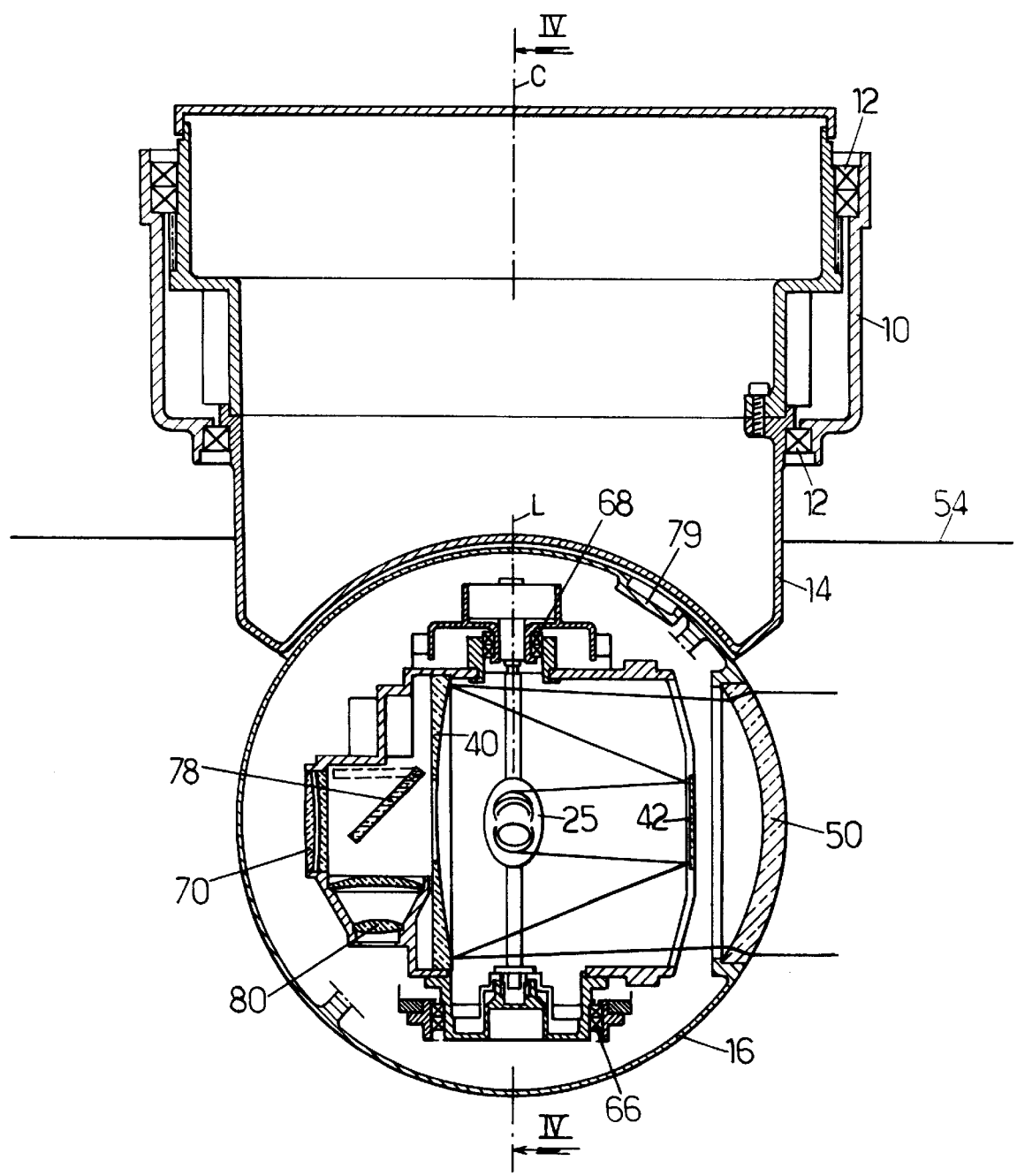

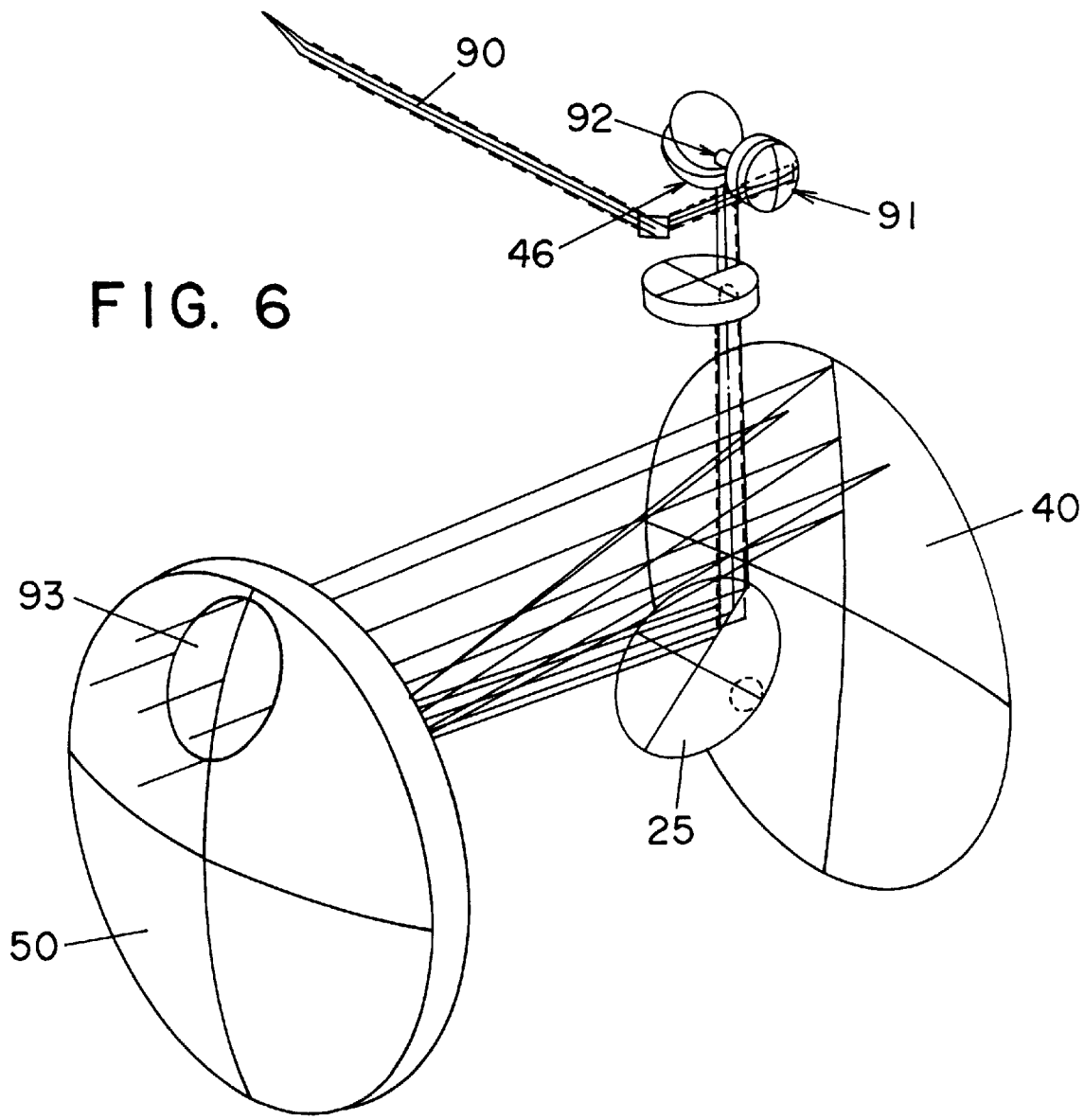

STABILIZED MULTISPECTRAL SIGHTING SYSTEM

BACKGROUND OF THE INVENTION

The present invention relates to stabilized sighting systems comprising a stabilization mirror that is angularly steerable about two mutually orthogonal axes, in general an optical system for receiving incoming light beams in a single multispectral channel, with separation between spectrum bands being performed downstream by appropriate optical channels.

Numerous systems of this type are already known. Document U.S. Pat. No. 4,393,957 describes one such system, in which the stabilization mirror is:

steerable about a first or "lateral" axis onto equipment that is itself steerable about a second axis orthogonal to the first and intersecting it (often an elevation axis)

onto an assembly that is steerable on a support about a third axis (a "circular" axis).

A servo system, including a gyroscopic sensor connected to the mirror via angular laws described below, serves to control steering motors so as to stabilize the sighting direction, and also attempts to maintain the sighting line orthogonal to a plane containing the lateral axis and the elevation axis.

For stabilizing the sighting line during angular displacement of the support, by rotating the mirror, it is necessary to turn the mirror through an angle that is half the angle through which the support turns in the light propagation plane, and also through an angle of full amplitude in the plane perpendicular to the outlet light beam, while the inertia of the mirror tends to keep it in the same direction. In the more common systems, there is no optical element (other than one that is purely transparent) interposed between the sighted scene and the mirror. Consequently, the size of the mirror is equal at least to the inlet pupil, so its inertia is high. The high inertia reduces its frequency passband and makes it difficult to implement a servo system capable of compensating for disturbances of a vibratory nature at high frequency. In addition, the large size of the mirror makes it necessary to devote a large amount of volume to stabilizing servo-control means.

SUMMARY OF THE INVENTION

An object of the invention is to provide a stabilized sighting system that makes it possible to reduce the size of the mirror, for a given pupil diameter, while nevertheless conserving a system that is multispectral.

To this end, the invention provides a system that includes, between the sighted scene and the mirror, a stabilized and purely catoptric optical system imparting a size to the inlet beam at its point of incidence on the mirror that is smaller than that of the inlet pupil.

It can be seen that the inertia of the catoptric optical system participates in stabilization since, while the support is turning, the moment of inertia of the optical system tends to keep it in the same orientation (insofar as it constitutes a balanced assembly). Specular reflections in the catoptric optical system do not give rise to chromatic aberration and do not degrade the spectrum passband as compared with some other system.

The catoptric optical system will generally be constituted by a telescope having a concave mirror of large diameter and a convex mirror of smaller diameter. Starting from a parallel incoming beam, the telescope delivers an outgoing beam that is parallel or convergent onto the stabilization mirror which is of very small diameter. Since the telescope is stabilized, it practically always constitutes a centered system that gives rise to little geometrical aberration.

A system of the kind described above is suitable for numerous applications, in particular on a mobile platform (aircraft, ship, or land vehicle). It can easily be implemented in such a manner as to provide omnidirectional sighting over a solid angle that considerably exceeds $2\mu$ steradians.

In an embodiment particularly adapted to detecting, recognizing and identifying, designating, and/or tracking over a large solid angle, the system may comprise:

a block comprising the catoptric optical system that is steerable over an angular range of about ±10° about a lateral axis relative to internal equipment which is itself steerable relative to external equipment about an internal elevation axis that is orthogonal to the lateral axis;

an external assembly that is steerable about a support around a circular axis which is parallel with or coincides with the lateral axis in a nominal position of the system, which external equipment may also include an external elevation axis parallel to the internal elevation axis, to support the inlet porthole and, depending on the mechanics, to make fine stabilization in elevation possible;

a stabilization mirror accompanying the catoptric optical system in its rotary displacements with its displacement being reduced by half about the lateral axis; and servo-control means comprising a gyroscopic sensor tied to the block, having sensing axes parallel one with the lateral axis and the other with the internal elevation axis, control loops for the motors providing servo-control about the lateral axis and the internal elevation axis under the control of the output signals from the gyroscopic sensor, and loops for copying the position of the block by controlling the steering motors about the external elevation axis and about the circular axis.

Depending on the mechanical structure, the existence of an external elevation axis makes stabilization possible in elevation, or in another angular direction.

The convex mirror and the stabilization mirror of the telescope give rise to central occultation of the inlet beam. Consequently, it is possible to provide a central opening in the concave mirror and to open up a light path for an optical system having an angular field that is greater than that of the telescope. In the common case of the external equipment constituting a cover fitted with an inlet porthole, that means the nominal angular position of the block containing the catoptric optical system must be inverted relative to the external equipment.

Such a system can thus be given:

a small angular field provided by the telescope for use by imaging channels and by telemetry, laser designation, reconnaissance and/or identification channels; and one or more larger angular fields e.g. for use in imaging, watching, and detection functions.

The above characteristics and others will appear better on reading the following description of a particular embodiment given by way of non-limiting example. The description refers to the accompanying drawings.

BRIEF DESCRIPTION OF THE DRAWINGS

FIGS. 2A and 2B diagrams showing light ray paths in a system of the invention for a small field (FIG. 2A) and for a large field (FIG. 2B);

FIG. 3 is a side view of a system constituting a particular embodiment and that is suitable for small-field aiming;

FIG. 6 shows a modification.

DETAILED DESCRIPTION

Figure 1:
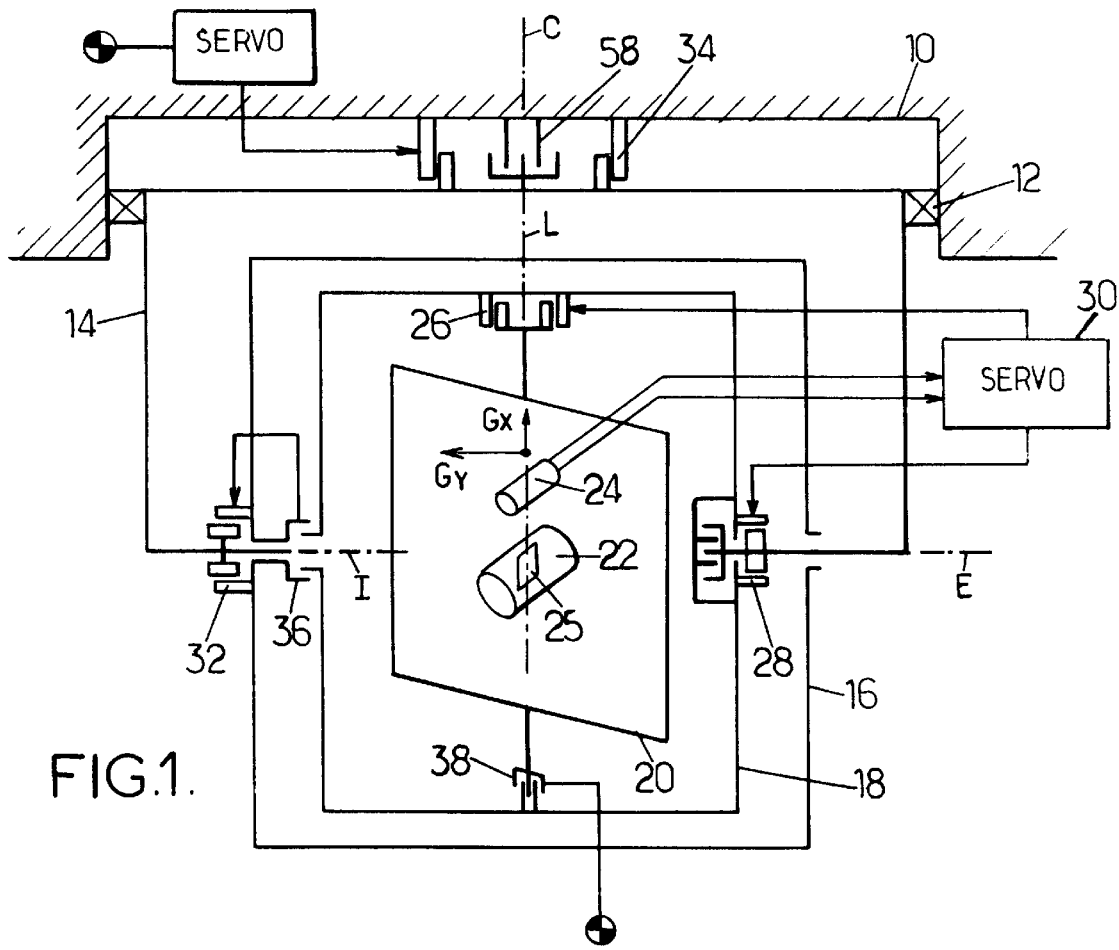
FIG. 1 is a diagram showing the locations and the relative disposition of the sighting servo-control means in a system constituting a particular embodiment of the invention.

FIG. 1 shows the general structure of a system that can be used on an aircraft for complete panoramic scanning and for elevation scanning over an angular range that may exceed 90°. A support 10 tied to the carrier (the structure of the aircraft) includes means such as ball bearings 12 that enable an external assembly 14 to turn about a circular axis C. The external assembly 14 includes means such as ball bearings defining an external elevation axis E about which external equipment 16 can turn, which external equipment which can be regarded as constituting a gimbal frame (or not if there is a follower cover). The external equipment 16 or the external assembly 14 also includes means defining an internal elevation axis I in alignment with the axis E and about which internal elevation equipment 18 can turn. Finally, the internal elevation equipment 18 includes means defining a lateral axis L about which a core of the system may rotate. Axis L is orthogonal to the elevation axis E and intersects the internal elevation axis, and about which the core of the system can turn, which core is constituted by a block 20 including the catoptric optical system 22 and designed to have a nominal sighting line orthogonal to the plane containing the lateral axis and the elevation axes. This block carries a gyroscopic sensor 24 which may be of any of the types used in inertial navigation systems, e.g. having a spin axis parallel to the sighting line. The sensing axes Gx and Gy of the sensor are respectively parallel to the lateral axis L and orthogonal to the lateral axis, i.e. parallel to the elevation axes.

This disposition is given by way of by way of example only. The axis C could equally well be a roll axis when mounted in a pod, with corresponding modifications to the directions of the other axes, depending on the intended use.

The core also includes a stabilizing mirror 25 that is rotatable about the lateral axis and that is rotated by the optical block 20 about the lateral axis with a reduction ratio of 1/2.

The servo-control means make it possible to send a constant inlet steering beam along a direction that is unchanging relative to the support, in spite of changes in the orientation of the support, said means comprising:

a lateral motor 26 and an internal elevation motor 28 controlled by a servo circuit 30 receiving the output signals from the gyroscopic sensor 24; and an external elevation motor 32 and a circular motor 34 respectively controlled responsive to signals from an angle indicator (potentiometer, synchronous machine) 36 mounted on the external elevation axis to detect the angle between the equipments 16 and 18, and from of an angle indicator 38 mounted on the lateral axis. The control circuits are designed to servo-control to zero the output signals from resolvers, and thus to enable angular positions to be copied.

The optical elements carried by the block 20 can have the structure shown in FIG. 2A. These elements comprise an aspherical primary mirror 40 of concave shape, and a convex secondary mirror 42, that is also aspherical and that is of smaller size than the mirror 40. The beam output by the secondary mirror 42 is taken up by the plane stabilization mirror 25 provided with a stepdown gear that causes it to turn through an angle equal to half that of the block about the lateral axis. The stabilization mirror sends its outlet beam to a bending mirror 46 carried by the external assembly 14. The bending mirror is generally designed to send the beam to one or more channels. FIG. 2A shows a system 47 co-operating with the telescope to form an afocal system, constituted by two groups of three lenses interposed on a common portion of the channels. The bending mirror may be constituted by a dichroic plate for separating the 1.06, 1.54 or 2 $\mu$m channels.

The mirror 25 is mounted on an axis in alignment with the lateral axis and independent therefrom, generally placed in the center of a cover of spherical shape belonging to the external equipment 16. The beam coming from the scene under observation penetrates into the system via a porthole 50 which is generally in the form of a plane or spherical plate having parallel faces. A plane porthole as shown in dotted lines in FIG. 5 makes it possible to reduce chromatic aberration to a minimum.

In the common case of a sighting system, the optical system made in this way having a telescope of small field with central occultation can be used for sighting in a plurality of regions of the spectrum simultaneously, which regions lie in a range that can extend in practice from 0.4 $\mu$m to 12 $\mu$m.

The dispositions shown in FIGS. 1 and 2 guarantee natural inertial stabilization of the telescope, i.e. of the parts thereof having the greatest moment of inertia. The mirror is itself stabilized in inertial manner, except about its own axis of rotation (the lateral axis); the moment of inertia of the porthole 50 and of its structure also contributes to stabilizing the porthole, which stabilization does not need to be performed very accurately, given that rotations of the porthole do not give rise to significant aberration.

Figure 4:
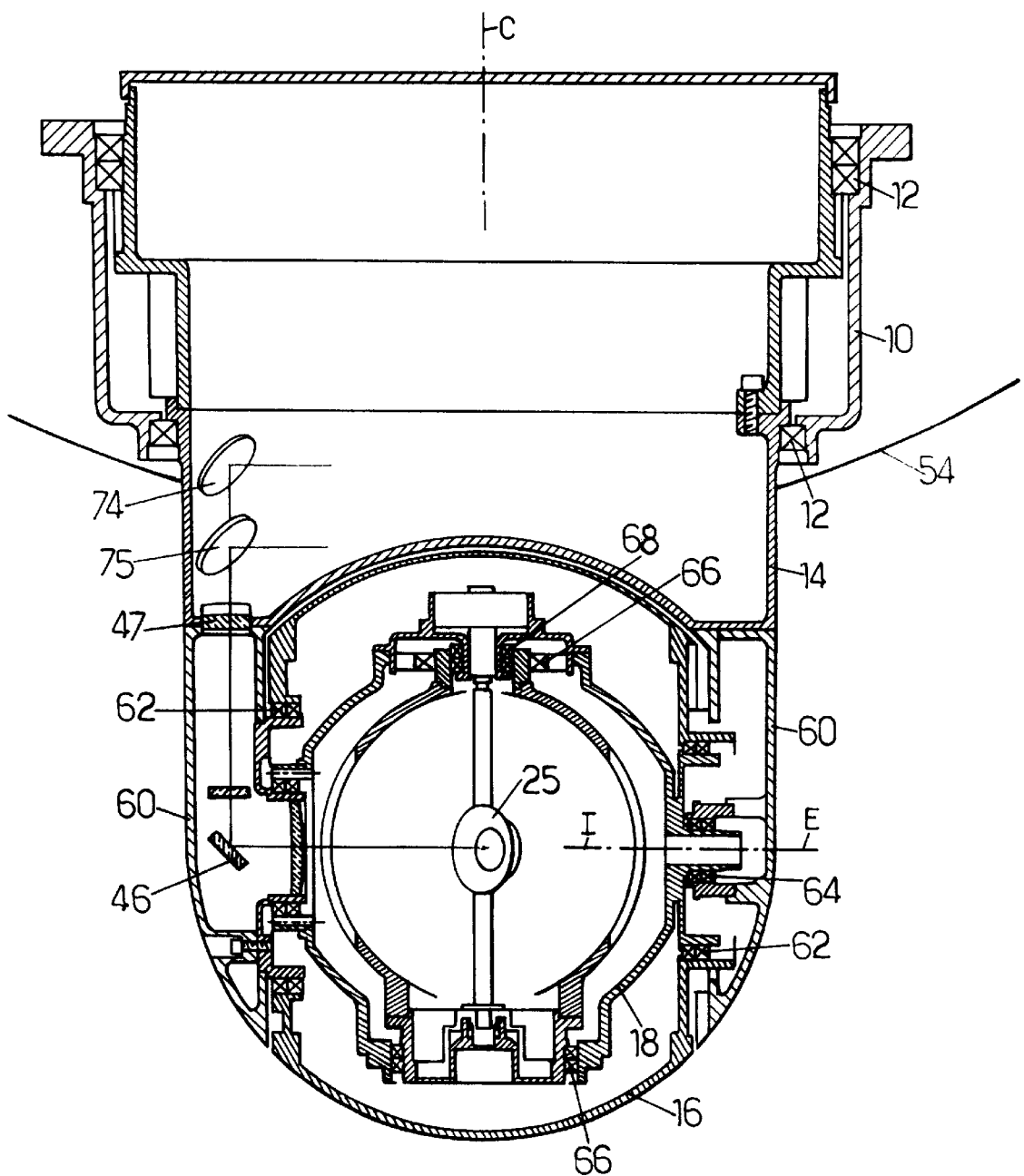
FIG. 4 is a simplified cross-section view on line IV—IV of FIG. 3.

The physical structure of the system can be as shown diagrammatically in FIGS. 3 and 4 in which elements corresponding to those described above are given the same reference numerals.

The support 10 is generally placed in the hold of an aircraft or of someother platform-constituting vehicle, and carries the ball bearings 12 that define the circular axis C. The external assembly 14 which is generally cylindrical in shape is mounted on the ball bearings 12. It projects from the aircraft through the skin 54 thereof. The external assembly 14 is provided with a motor and gearbox unit (not shown in FIGS. 3 and 4) enabling it to turn without limitation on its amplitude, and also with a resolver 58 (FIG. 1).

The bottom portion of the external assembly 14 is constituted by two side plates 60 (FIG. 4) provided with ball bearings 62 defining the external elevation axis E about which the ball-shaped external elevation equipment 16 turns. This shape is the shape which best avoids unbalance due to aerodynamic forces when the platform is moving at high speed. This disposition also makes it possible for the external elevation motor 32 to move the external elevation equipment 16 without difficulty over an angular range of about ±180°. A second set of bearings 64 enables the internal elevation equipment 18 to turn about an axis I that is in alignment with the axis E. The ball bearings 64 can be carried either by the external elevation equipment 16, or by the external assembly 14.

The ball bearings 66 carried by the internal elevation equipment 18 enable the optical block to turn about the lateral axis L which coincides with the axis of rotation of the stabilization mirror 25 as defined by additional bearings 68. Stabilization can be achieved providing the internal elevation equipment can be moved through an angular range of a few degrees relative to its nominal position.

To make it possible to switch fields, the internal elevation equipment is rotatable through at least 90° from the position shown in FIG. 3, as explained below.

The stabilization mirror 25 itself turns about the axis L on bearings 68 and it is driven at a ratio of 1/2 by the optical block for stabilization and through 90° to make field switching possible.

In order to reduce the diameter of the ball, the sensors of the device are advantageously placed in the support 10 or the assembly 14. The incoming light flux that is passed through the porthole is reflected by the mirror of the telescope, then by the deflection and stabilization mirror 25, and thereafter it penetrates into a light duct formed through one of the side plates 60 that includes a bending mirror 46 and the back lenses 47 of an afocal system. The sensors themselves may be of known structure, e.g. one of the structure described in U.S. Pat. No. 4,393,957 assigned to the Assignee of the present invention. A dichroic plate 74 serves to split the incoming beam between one channel covering the range 3 $\mu$m to 5 $\mu$m, for example, and another channel covering the range 8 $\mu$m to 12 $\mu$m, for example.

In the assembly constructed in this way, it is also possible to insert an optical device for emitting and receiving laser channels (for telemetry and laser illumination functions), as shown in FIG. 6. The laser emission channel, which is of very small field, can be constituted by a very narrow parallel beam 90 through the side plate 60. Thereafter the beam is adapted via an optical bend 91 to be mixed with the other receiver channels via a small zone 92 of dichroic material in the deflection or bending mirror 46. The transmitted beam then passes through the assembly 25, 40, 42 for steering and stabilizing the reception channels while occupying a small portion of the pupil 93.

The laser reception channel uses the entire pupil of the common afocal reception system. A dichroic plate 75 can be implanted in or after the afocal system which is terminated by the lenses 47, upstream from the dichroic plate 74 which separates the 3–5 $\mu$m and the 8–12 $\mu$m bands.

In order to be capable of passing such a broad frequency band, the inlet porthole is generally made of zinc sulfide protected by a hard layer that withstands erosion (e.g. diamond carbon). The lenses are made of zinc sulfide or of zinc selenide.

Because of the servo-control technique used, the internal elevation axis and the lateral axis are nearly always in the canonical position, being perpendicular to the spin axis of the gyroscopic sensor 24, which is itself parallel to the sighting line. It will often be preferable to use a dry gyro having a high frequency of rotation in order to obtain a large passband and achieve small stabilization residual error.

As mentioned above, servo-controlling the circular motor, once the sighting axis has been steered, serves to copy the lateral axis so as to cancel on a permanent basis the angle between the lateral axis and its canonical position.

The disposition described above makes it possible to obtain a high ratio, of the order of 1/2, between the diameter of the small field inlet beam and the outside diameter of the ball. By using a telescope, it is possible to obtain a larger pupil size, and that is necessary when operating with a small field for reasons of diffraction. By way of example, it may be observed that the afocal system constituted by all of the optical elements from the inlet porthole to the scanning mirror belonging to the sensor assembly can provide an optical field of about 1.5°, with an inlet diameter of 136 mm for a ball having a diameter of about 260 mm.

Figure 5:
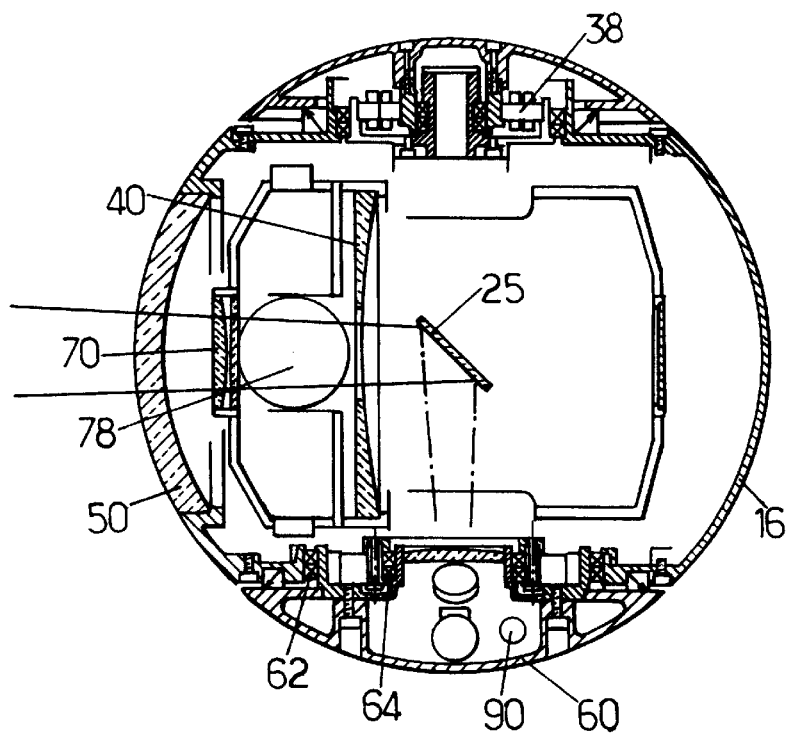
FIG. 5 is a plan view in cross-section on a plane containing the elevation axes, showing the disposition of the components for large field use.

The system shown diagrammatically in FIGS. 3 and 5 makes it possible to change the field of view by rotating the internal elevation equipment through 180° relative to the external elevation equipment 16 and by rotating the mirror 25 through 90°, thereby replacing the telescope by another optical system. The primary and secondary mirrors then take up the positions shown in dashed lines in FIG. 2B.

The light beam then passes through the central hole of the primary mirror 40 and passes through a wide angle optical system 70 constituted by a group of lenses, before reaching the mirror 25. Mirror 25 directs the beam to the mirror 46 and the optical system which constitutes an afocal system with the inlet system 70.

It is possible to add further to the system by providing a deflection mirror 78 capable of tilting through 45° about its bottom edge, so as to send the beam parallel to the lateral axis through another optical system 80 adapted for an even larger field (e.g. 24° or 40°), which would require the presence of an additional small porthole 79.

What is claimed is:

1. A stabilized sighting system having:
    a purely catoptric optical input system located on a path of an incoming light beam and mounted for rotation about a first axis on an internal equipment;
    a sight stabilization mirror operatively associated with said optical input system for rotation therewith with a reduction ratio of 1/2;
    first means for steering said stabilization mirror and optical input system about said first axis on said internal equipment;
    second means for steering said internal equipment with respect to an external equipment about a second axis orthogonal to said first axis and intersecting said first axis;
    third means for steering said external equipment with respect to an external assembly about a third axis coaxial with the second axis; and
    fourth means for steering said external assembly on a support about a fourth axis;
    each of said first, second, third and fourth axis having motor means; and
    a servo-control system including a gyroscopic sensor associated with said optical input system and controlling said motor means;
    said optical input system giving the incoming beam a size on the stabilization mirror that is smaller than a size of an inlet pupil of the optical input system.

2. A system according to claim 1, wherein the catoptric optical system comprises a telescope having an inlet concave mirror of large diameter and a convex mirror of smaller diameter delivering, from said incoming beam, an outlet beam that is converging on the stabilization mirror.

3. A system according to claim 2, having a deflection mirror carried by the external assembly and steering the beam received from the stabilization mirror to a channel parallel to the circular axis and including lenses constituting an afocal system with the telescope.

4. A system according to claim 3, wherein the deflection mirror includes a small zone in the form of a dichroic plate allowing an the emitted laser beam to pass for telemetry or for laser illumination, said laser beam having a very narrow field and following a separate channel through a side plate and then, after being transmitted through an dichroic portion of the deflection mirror, following a common channel, while occupying a small portion of its pupil.

5. A system according to claim 2, wherein said concave mirror has a central opening of diameter that corresponds to occultation by the convex mirror, and the internal equipment is displaceable through more than 180° about the internal elevation axis to leave free an access passage for an inlet beam to a second optical system, of angular field greater than that of the telescope, and located upstream from the stabilization mirror, and the stabilization mirror is movable through 90° to reflect a beam that is incoming through a porthole to a bending mirror.

6. A system according to claim 5, wherein said optical system further comprises a deflection mirror placed to reflect the beam coming from the stabilization mirror on a direction parallel to the lateral axis towards a dioptric system constituting another afocal system with a second optical system for obtaining other fields, which are generally larger.

7. A system according to claim 5, wherein the bending mirror is constituted by a dichroic plate for separating the incoming beam into 1.06 $\mu$m, 1.54 $\mu$m or 2 $\mu$m channels.

8. A stabilized sighting system having:
   an optical block comprising a purely catoptric optical input system located on a path of an incoming light beam and mounted for rotation about a lateral axis on an internal elevation equipment which is angularly steerable relative to an external equipment about an internal elevation axis that is orthogonal to the lateral axis, said external equipment being angularly steerable with respect to a support about an external elevation axis aligned with the internal elevation axis and about a circular axis;
   a sight stabilization mirror operatively associated with said optical input system for rotation therewith with a reduction ratio of 1/2; and
   a servo-control system including:
     a gyroscopic sensor tied to said block, said sensor having sensing axes parallel one with the lateral axis and the other with the internal elevation axis,
     control loops for controlling motors providing actuation of the block about the lateral axis and of the internal elevation equipment about the internal elevation axis responsive to output signals from the gyroscopic sensor, and
     loops for controlling motors for actuation of the external equipment about the external elevation axis and about the circular axis for the external equipment to recopy a position of the optical block,
   said optical input system giving the incoming beam a size on the sight stabilization mirror that is smaller than a size of an inlet pupil of the optical input system.

9. A stabilized sighting system according to claim 8, wherein said block is steerable over an angular range of about plus and minus 10° from a mid position.

10. A stabilized sighting system according to claim 8, further having an external assembly which is steerable about said support around said circular axis which has a direction parallel to a direction of the lateral axis in a nominal position of the system, said external equipment being steerable about said external elevation axis relative to said external assembly.

11. A system according to claim 10, wherein the external elevation equipment has a cover in the form of a ball fitted with a porthole in the form of a spherical or plane plate having faces that are parallel.

12. A system according to claim 11, wherein the external elevation equipment is mounted on ball bearings defining the external elevation axis, carried by two side plates constituting a bottom portion of the external assembly.

* * * * *